(12) United States Patent
Feris et al.

(10) Patent No.: US 10,679,047 B2
(45) Date of Patent: *Jun. 9, 2020

(54) SYSTEM AND METHOD FOR POSE-AWARE FEATURE LEARNING

(71) Applicant: International Business Machines Corporation, Armonk, NY (US)

(72) Inventors: Rogerio Schmidt Feris, Hartford, CT (US); Minkyong Kim, Scarsdale, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/858,314

(22) Filed: Dec. 29, 2017

(65) Prior Publication Data
US 2018/0173944 A1    Jun. 21, 2018

Related U.S. Application Data

(63) Continuation of application No. 14/954,934, filed on Nov. 30, 2015, now Pat. No. 9,953,217.

(51) Int. Cl.
G06K 9/00 (2006.01)
G06T 7/73 (2017.01)
G06K 9/62 (2006.01)
G06T 7/13 (2017.01)
G06T 7/55 (2017.01)

(52) U.S. Cl.
CPC ..... G06K 9/00369 (2013.01); G06K 9/00295 (2013.01); G06K 9/6255 (2013.01); G06T 7/13 (2017.01); G06T 7/55 (2017.01); G06T 7/73 (2017.01); G06T 2207/10016 (2013.01); G06T 2207/20081 (2013.01);

(Continued)

(58) Field of Classification Search
None
See application file for complete search history.

(56) References Cited

U.S. PATENT DOCUMENTS 6,778,703 B1 * 8/2004 Zlotnick ............ G06K 9/00449
382/218
8,068,676 B2 11/2011 Zhang et al.
(Continued)

FOREIGN PATENT DOCUMENTS

CN    103824055 A    5/2014

OTHER PUBLICATIONS

Qiang Chen, et al., "Deep Domain Adaptation for Describing People Based on Fine-Grained Clothing Attributes", IBM Research Australia, IBM T.J. Watson Research Center, and National University of Singapore, pp. 1-10, Jun. 2015.

Junshi Huang, et al., "Cross-Domain Image Retrievel with a Dual Attribute-Aware Ranking Network", National University of Singapore, IBM T.J. Watson Research Center, and IBM Research Australia, pp. 1-9, May 29, 2015.

(Continued)

*Primary Examiner* — Bernard Krasnic
(74) *Attorney, Agent, or Firm* — Anthony Curro, Esq.; McGinn I.P. law Group, PLLC.

(57)    ABSTRACT

An object recognition system includes a parameter generator for generating a parameter that indicates whether an object depicted in an image pair is the same or different object, and a pose difference for the image pair and a parameter refiner for refining the parameter, and an applicator for applying the refined parameter to object recognition.

20 Claims, 11 Drawing Sheets

(52) U.S. Cl.
CPC ............... *G06T 2207/20084* (2013.01); *G06T 2207/30196* (2013.01); *G06T 2207/30232* (2013.01); *G06T 2210/16* (2013.01)

(56) References Cited

U.S. PATENT DOCUMENTS

| | | | |
|---|---|---|---|
| 8,379,920 | B2 | 2/2013 | Yang et al. |
| 8,798,362 | B2 | 8/2014 | Wang et al. |
| 9,436,895 | B1 | 9/2016 | Jones |
| 9,953,217 | B2* | 4/2018 | Feris ............... G06K 9/00369 |
| 2007/0183651 | A1* | 8/2007 | Comaniciu ........ G06K 9/00248 |
| | | | 382/154 |
| 2009/0304272 | A1 | 12/2009 | Makadia |
| 2013/0250181 | A1 | 9/2013 | Zhang |
| 2014/0098221 | A1 | 4/2014 | Brown |

OTHER PUBLICATIONS

Gallagher, et al., "Clothing Cosegmentation for Recognizing People", Carnegie Mellon University and Pittsburgh, PA, 2008.
Kiapour, et al., "Hipster Wars: Discovering Elements of Fashion Styles", University of North Carolina at Chapel Hill, NC, 2014.
Song, et al., "Predicting Occupation Via Human Clothing and Contexts", Department of Electrical and Computer Engineering, School of Computing, National University of Singapore, and Microsoft Research Asia, 2011.
Kwak, et al., "From Bikers to Surfers: Visual Recognition of Urban Tribes", Department of Science and Engineering, 2013.
Jayaraman, D. Learning Image Representations Equivariant to Ego-Motion', May 8, 2015.
Bell, S. Learning Visual Similarity for Product design with Convolutional Neural Networks—ACM Transactions on Graphics—Siggraph '15 Aug. 9-13, 2015—pp. 1-10.

* cited by examiner

SYSTEM AND METHOD FOR POSE-AWARE FEATURE LEARNING

The present application is a Continuation application of U.S. patent application Ser. No. 14/954,934, which was filed on Nov. 30, 2015.

BACKGROUND OF THE INVENTION

Field of the Invention

The present invention relates to a pose-aware feature learning system and object recognition system and, more particularly, a pose-aware feature learning system which trains a neural network based on a labeled plurality of image pairs, to predict whether an image pair depicts the same or different object and a pose difference for the image pair.

Description of the Related Art

Machine learning tasks such as classification often require input that is mathematically and computationally convenient to process. However, raw data such as images, video, and sensor measurement is usually complex, redundant, and highly variable.

Feature learning is a technique which discovers useful features or representations from raw data, and generates an output which is mathematically and computationally convenient to process in a machine learning task.

SUMMARY OF THE INVENTION

In view of the foregoing and other problems, disadvantages, and drawbacks of the aforementioned conventional systems and methods, an exemplary aspect of the present invention is directed to a pose-aware feature learning system and an object recognition system which are more effective and more efficient than conventional methods and systems.

An exemplary aspect of the present invention is directed to a pose-aware feature learning system which includes an object tracker which tracks an object on a subject in a plurality of video frames, a pose estimator which estimates a pose of the subject in a track of the plurality of video frames, an image pair generator which extracts a plurality of image pairs from the track of the plurality of video frames, and labels the plurality of image pairs with the estimated pose and as depicting the same or different object, and a neural network trainer which trains a neural network based on the labeled plurality of image pairs, to predict whether an image pair depicts the same or different object and a pose difference for the image pair.

Another exemplary aspect of the present invention is directed to a method of feature learning. The method includes tracking an object on a subject in a plurality of video frames, estimating a pose of the subject in a track of the plurality of video frames, extracting a plurality of image pairs from the track of the plurality of video frames, and labeling the plurality of image pairs with the estimated pose and as depicting the same or different object, and training a neural network based on the labeled plurality of image pairs, to predict whether an image pair depicts the same or different object and a pose difference for the image pair.

Another exemplary aspect of the present invention is directed to an object recognition system which includes a pose-aware feature learning system which trains a neural network based on a labeled plurality of image pairs, to predict whether an image pair depicts the same or different object and a pose difference for the image pair.

Another exemplary aspect of the present invention is directed to a programmable storage medium tangibly embodying a program of machine-readable instructions executable by a digital processing apparatus to perform the method of feature learning of the present invention.

With its unique and novel features, the present invention provides a pose-aware feature learning system and object recognition system which are more effective and more efficient than conventional methods and systems.

BRIEF DESCRIPTION OF THE DRAWINGS

The foregoing and other objects, aspects and advantages will be better understood from the following detailed description of the embodiments of the invention with reference to the drawings, in which.

DETAILED DESCRIPTION OF THE EXEMPLARY EMBODIMENTS OF THE INVENTION

Figure 1:
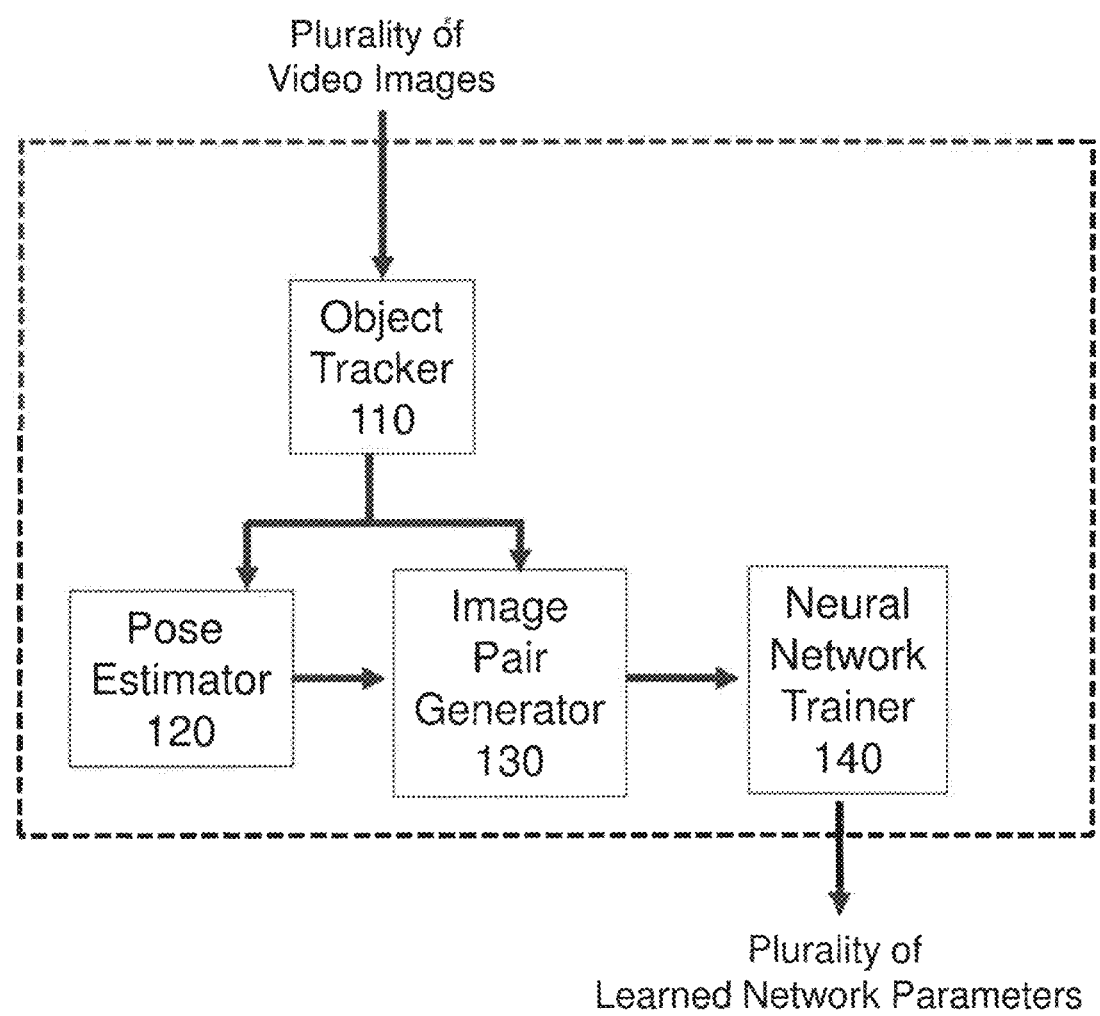
FIG. 1 illustrates a pose-aware feature learning system 100 according to an exemplary aspect of the present invention.

Referring now to the drawings, FIGS. 1-10 illustrate the exemplary aspects of the present invention.

Overview

Conventional methods of feature learning are used to recognize objects such as clothing in a photo or video. Such conventional methods may segment and classify clothing from surveillance videos, or may classify clothing based on a determined color composition, texture composition, collar configuration, and sleeve configuration. However, such conventional methods require costly manual annotation for training data.

The present invention may address the problems of conventional methods, by providing a method of feature learning without requiring costly manual annotation. That is, given as input an image of a person, an exemplary aspect of the present invention may describe (e.g., automatically describe) the clothing the person is wearing using a novel computer vision algorithm based on deep learning. Thus, for example, an exemplary aspect of the present invention may automatically recognize objects such as clothing, handbags, hats, shoes, and produce tags such as 't-shirt', 'light blue color', 'thin horizontal stripes', etc.

One problem with conventional methods of clothing recognition is that there are not enough training samples for each clothing attribute, causing the well-known overfitting problem with learning models having a large number of parameters, such as deep learning models. The present invention may address this problem of the conventional methods of clothing recognition.

The present invention may be used, for example, in the fashion industry for recognizing clothing and accessories, and making fashion recommendations for customers. For example, an exemplary aspect of the present invention may recognize (e.g., automatically recognize) fine-grained clothing attributes from images which is a key step for mining fashion trends from social media.

That is, an application of the present invention involves fashion analytics and cognitive computing. As this application domain also requires the prediction of a large set of fine-grained clothing attributes, the "overfitting" problem is a major problem that has not been solved by conventional methods.

The present invention may also be used for recognizing missing persons such as children, autistic persons, and cohorts with mental health diseases such as Alzheimer's.

The present invention may also have security applications, such as surveillance, anti-crime and anti-terrorism applications.

In particular, the present invention may have the capability of searching for persons such as criminal suspects or missing people based on the clothing that the persons are wearing. For example, in a particular embodiment, a user may query the present invention with "show me all people with a black down jacket and denim pants from time x to time y, considering all cameras in the downtown area", and in response to the query, extract images from the video recorded by those cameras which satisfy the query, and present the user with the extracted images.

Feature Learning System

FIG. 1 illustrates a pose-aware feature learning system 100 according to an exemplary aspect of the present invention.

As illustrated in FIG. 1, the pose-aware feature learning system 100 includes an object tracker 110 which tracks an object on a subject in a plurality of video frames, a pose estimator 120 which estimates a pose of the subject in a track of the plurality of video frames, an image pair generator 130 which extracts a plurality of image pairs from the track of the plurality of video frames, and labels the plurality of image pairs with the estimated pose and as depicting the same or different object, and a neural network trainer 140 which trains a neural network based on the labeled plurality of image pairs, to predict whether an image pair depicts the same or different object and a pose difference for the image pair (e.g., generate a plurality of learned network parameters which predicts whether an image pair depicts the same or different object and a pose difference for the image pair).

Object Tracker

The object tracker 110 tracks an object on a subject in a plurality of video frames. In particular, the object tracker 110 may receive a video frame (e.g., a single video frame) in which the object has been detected (e.g., a video frame including a "bounding box" formed around the object (e.g., clothing region) being tracked), and output a sequence of corresponding image regions in subsequent frames of a plurality of video frames.

The object tracker 110 may track in the video sequence, the object which has been previously detected in a video frame. That is, the plurality of video frames in which the object tracker 110 tracks the object may be a sequence of video frames subsequent to an initial video frame in which the object was detected.

Figure 2:
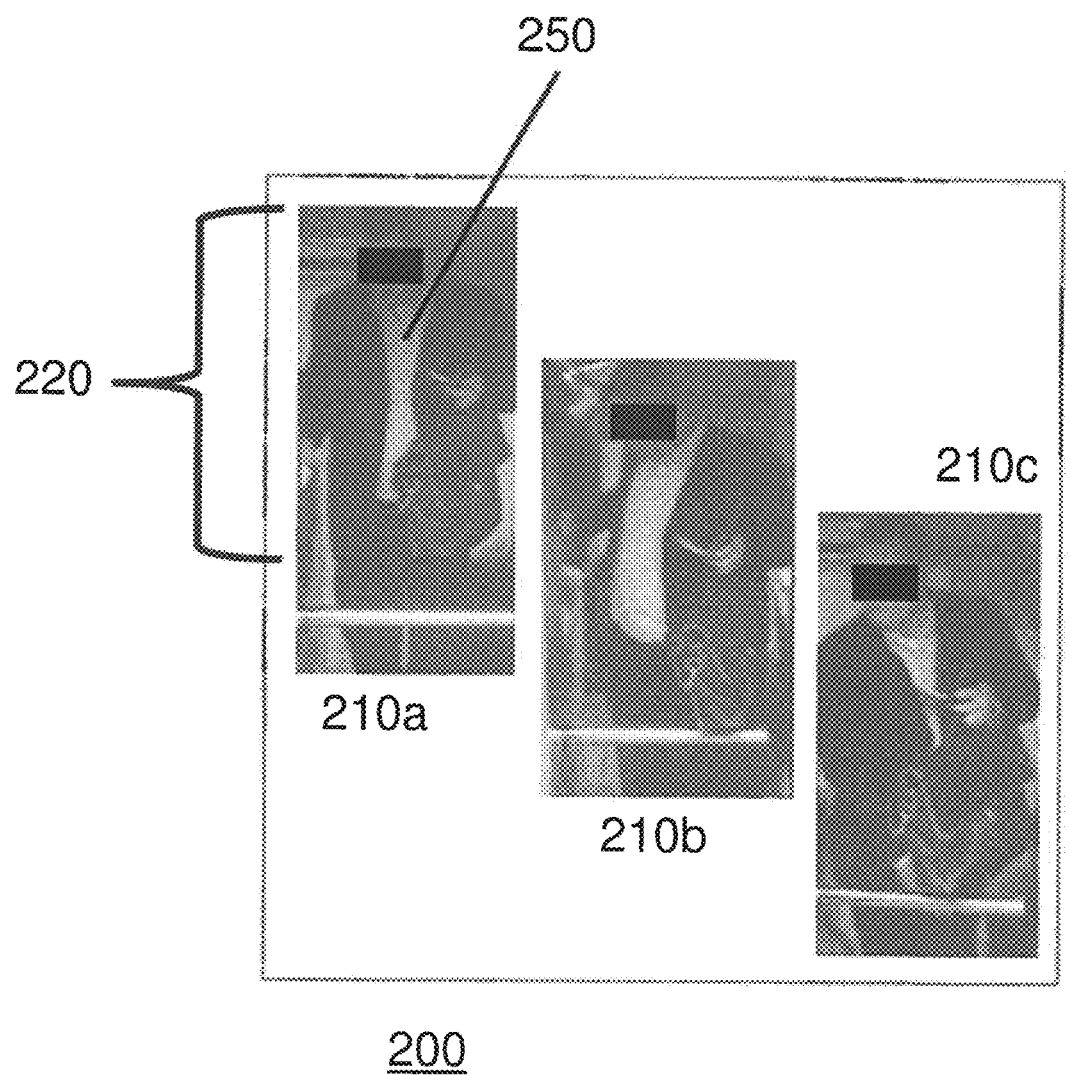
FIG. 2 illustrates a track 200 of a plurality of video frames 210a, 210b, 210c, according to an exemplary aspect of the present invention.

FIG. 2 illustrates a track 200 of a plurality of video frames 210a, 210b, 210c, according to an exemplary aspect of the present invention.

As illustrated in FIG. 2, the subject 250 in the video frames 210a, 210b and 210c appears to be a man, and the object 220 being tracked in the video frames 210a, 210b and 210c is a clothing region (e.g., shirt, jacket, etc.). That is, the object being tracked may include an item of clothing being worn by the subject 250.

Although FIG. 2 illustrates only one subject 200, the object tracker 110 may track an object on a plurality of subjects in a plurality of tracks of a plurality of video frames, where a track of the plurality of tracks may correspond to a subject of the plurality of subjects, respectively.

Pose Estimator

The pose estimator 120 estimates a pose (e.g., orientation) of the subject 250 in the track 200 of the plurality of video frames 210a, 210b and 210c. In particular, the pose estimator 120 may input the image regions from the object tracker 110, and output the estimated pose of the subject 250 (e.g., an orientation (e.g., thetax, thetay, thetaz) of the subject's body).

For example, the pose estimator 120 may estimate the pose of the subject 250 based on body joint coordinates of the subject 250.

Image Pair Generator

The image pair generator 130 extracts a plurality of image pairs from the track 200 of the plurality of video frames 210a, 210b and 210c, and labels the plurality of image pairs with the estimated pose and as depicting the same or different object (e.g., clothing region).

In particular, the image pair generator 130 may input the plurality image regions from the object tracker 110, and output the plurality of labeled image pairs (e.g., a large set of image pairs containing same/not same and pose labels).

The image pair generator 130 may select, for example, the plurality of image pairs to minimize data redundancy in terms of body pose and a lighting condition. The image pair generator 130 may also use only high-confidence tracks of the plurality of tracks of video images in the extracting of the image pairs.

Neural Network Trainer

The neural network trainer 140 trains a neural network (e.g., a deep neural network model) based on the labeled plurality of image pairs, to predict whether an image pair depicts the same or different object and a pose difference for the image pair. For example, the neural network trainer may generate a plurality of learned network parameters which predict whether the image pair depicts the same or different object and a pose difference for the image pair.

In particular, the neural network trainer 140 may receive the labeled image pairs from the image pair generator 130 (e.g., a large set of image pairs containing same/not same object and pose labels), and output the plurality of learned network parameters.

The plurality of learned network parameters may predict whether an image pair of the plurality of image pairs depicts the same or different object and a body pose difference (i.e., a pose offset) of the image pair. The learned network parameters may be used (e.g., in an object recognition system) as network initialization for training neural networks to predict attributes of the tracked object. For example, where the tracked object was clothing, the attributes may include clothing attributes such as a color of the clothing, a pattern of the clothing, a style of the clothing, and a material of the clothing.

Importantly, the "image pairs" used to train the neural network in the pose-aware feature learning system 100 may be generated automatically without having the user to provide manually annotated labels. That is, the neural network trainer 140 may train the neural network without manually annotating a video frame of the plurality of video frames. Thus, the present invention may save significant time and money compared to conventional feature learning systems.

The neural network may include a plurality of nodes indicating a confidence of a plurality of attributes of the object which is being tracked. Thus, for example, where the object being tracked is clothing (e.g., the clothing region of an image in the sequence (e.g., track) of video frames), the plurality of nodes may indicate a confidence of a plurality of clothing attributes of the item of clothing, respectively.

Figure 3:
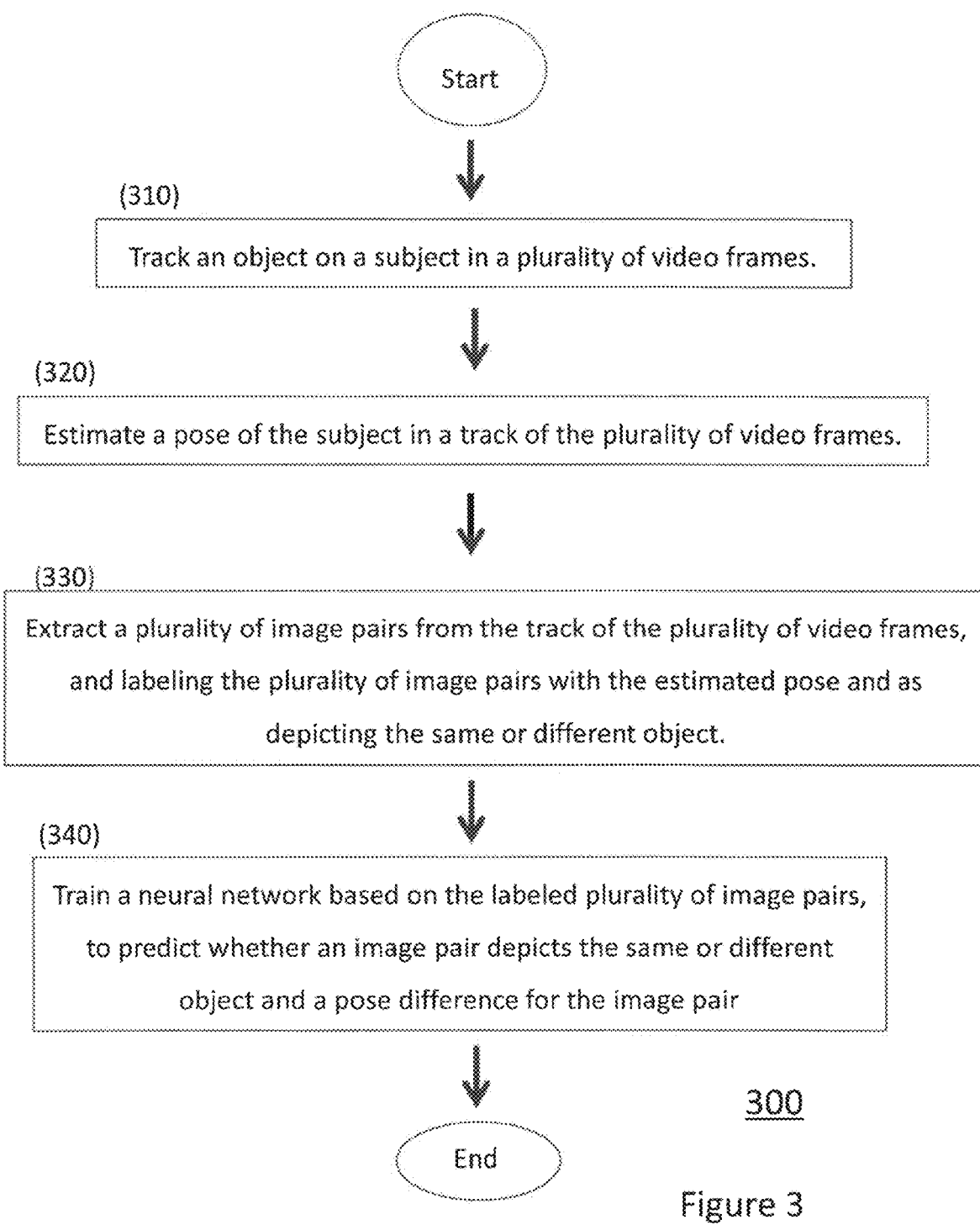
FIG. 3 illustrates a method 300 of feature learning, according to another exemplary aspect of the present invention.

Referring again to the drawings, FIG. 3 illustrates a method 300 of feature learning, according to another exemplary aspect of the present invention.

As illustrated in FIG. 3, the method 300 includes tracking (310) an object on a subject in a plurality of video frames, estimating (320) a pose of the subject in a track of the plurality of video frames, extracting (330) a plurality of image pairs from the track of the plurality of video frames, and labeling the plurality of image pairs with the estimated pose and as depicting the same or different object, and training (340) a neural network based on the labeled plurality of image pairs, to predict whether an image pair depicts the same or different object and a pose difference for the image pair.

Figure 4:
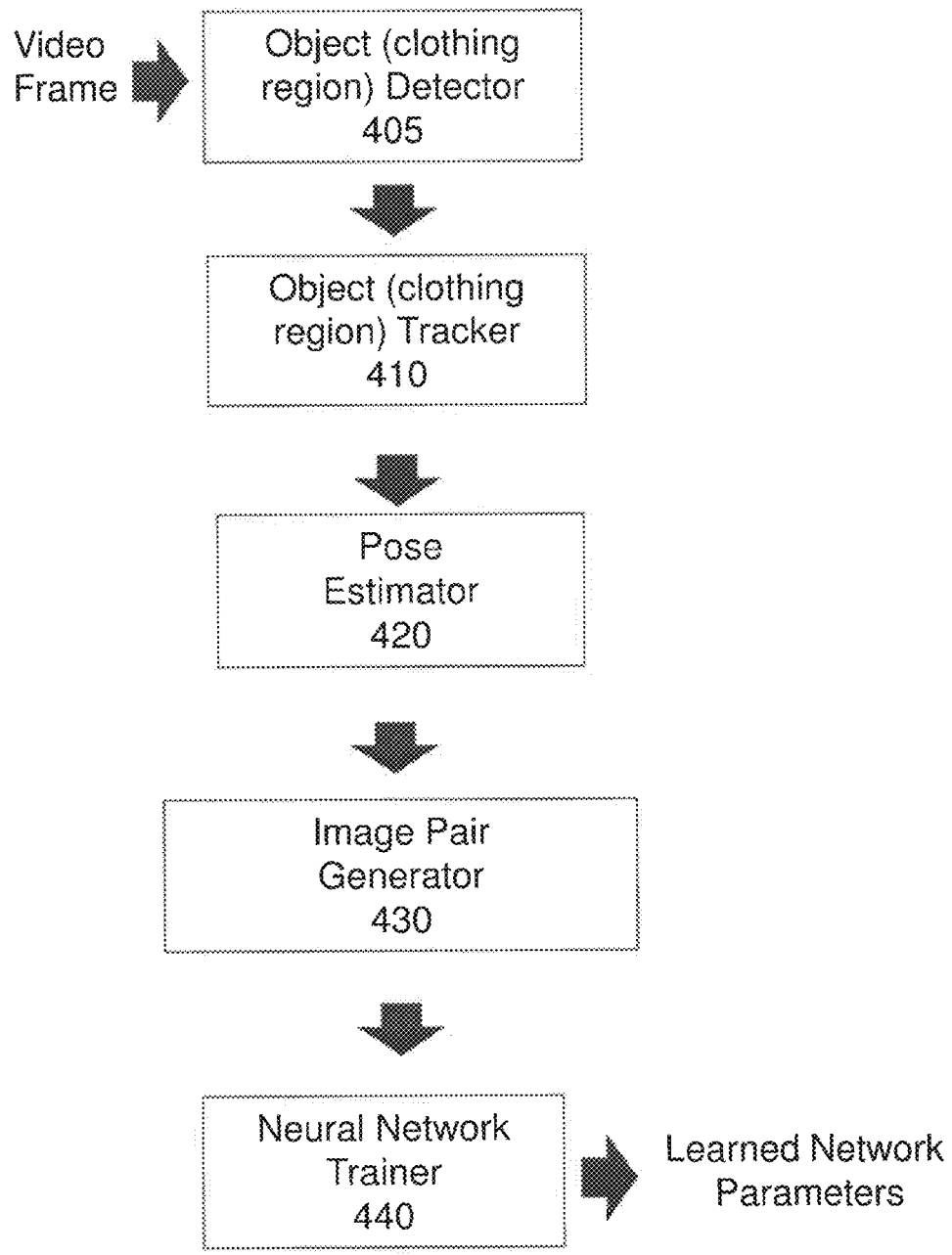
FIG. 4 illustrates a pose-aware feature learning system 400, according to another exemplary aspect of the present invention.

FIG. 4 illustrates a pose-aware feature learning system 400, according to another exemplary aspect of the present invention.

As illustrated in FIG. 4, the method 400 includes an object detector 405 which detects the object (e.g., clothing region) on the subject in a video frame (e.g., in a video frame of a plurality of video frames), and transmits the video frame including the detected object (e.g., a bounding box which surrounds the object) to the object tracker 110. In particular, the object detector 405 may include detect only high-confidence objects in the video frame.

Similar to the pose-aware feature learning system 100, the pose-aware feature learning system 400 also includes an object tracker 410 which tracks an object (e.g., clothing region) on a subject in a plurality of video frames, a pose estimator 420 which estimates a pose (e.g., body pose) of the subject in a track of the plurality of video frames, an image pair generator 430 which extracts a plurality of image pairs from the track of the plurality of video frames, and labels the plurality of image pairs with the estimated pose and as depicting the same or different object (e.g., generates same/not same image pairs), and a neural network trainer 440 which trains a neural network based on the labeled plurality of image pairs, to predict whether an image pair depicts the same or different object and a pose difference for the image pair.

Training the Neural Network

The pose-aware feature learning system 100, 400 may train the neural network, for example, by using video captured by a surveillance camera (e.g., a surveillance camera monitoring an entry checkpoint). In this particular example, the pose-aware feature learning system 100, 400 can learn the network parameters (feature generator) that are tailored to discriminative clothing visual features in the video captured by the surveillance camera, and are also aware of the body pose of subjects in the video captured by the surveillance camera.

A conventional feature learning system may use random weights to initialize a neural network, which is likely to cause an "overfitting" issue, or may attempt to initialize a neural network parameters with manually annotated training samples which is likely to be very expensive and time consuming. These problems of the conventional feature learning system may be addressed by the pose-aware feature learning system 100, 400.

Figure 5A:
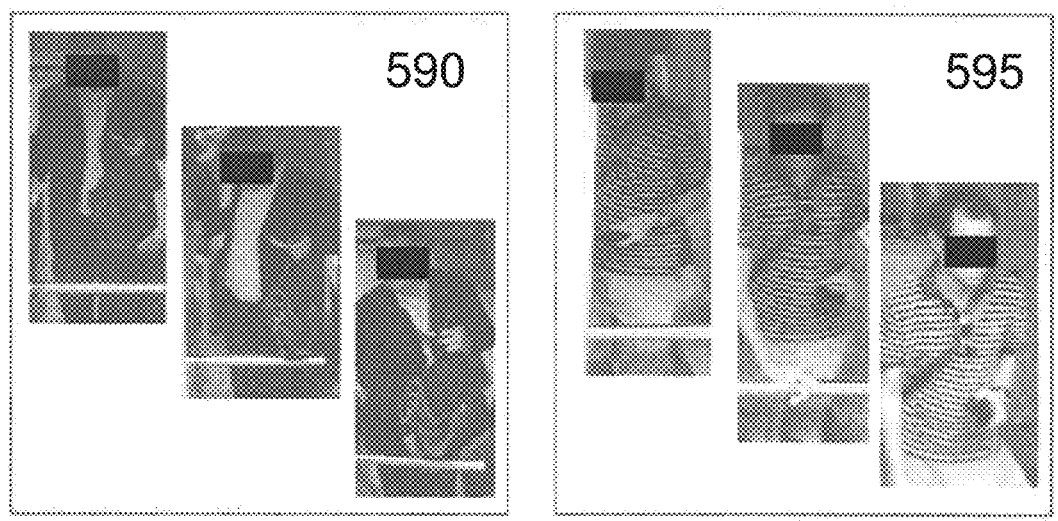
FIG. 5A illustrates a first track 590 of video frames and a second track 595 of video frames, which may be obtained, for example, by a surveillance camera, according to an exemplary aspect of the present invention.

FIG. 5A illustrates a first track 890 of video frames and a second track 895 of video frames, which may be obtained, for example, by a surveillance camera, according to an exemplary aspect of the present invention.

As illustrated in FIG. 5A, the surveillance camera may capture video of a plurality of different subjects (e.g., a plurality of persons) and a plurality of objects (e.g., types of clothing) on the subjects, and in the video, the subjects may have a plurality of different poses. Thus, for example, the first track 590 in FIG. 5A illustrates a first subject in three video frames. The first subject has a different pose in each of the three video frames, but the same object is on the first subject. That is, the object being tracked in the first track 590 is the clothing being worn by the first subject, and the first subject is wearing the same clothing in each of the video frames of the track 590.

Similarly, the second track 595 in FIG. 5A illustrates a second subject in three video frames. The second subject has a different pose in each of the three video frames, but the same object is on the second subject. That is, the object being tracked in the second track 595 is the clothing being worn by the second subject, and the second subject is wearing the same clothing in each of the video frames of the track 595.

The pose-aware feature learning system 100, 400 can train a neural network which to learn how to tell whether a plurality of images (e.g., two images) depict the same object (e.g., clothing) by providing as input pairs of images of the same track. The neural network can also be trained (e.g., by the pose-aware feature learning system 100, 400) to predict the body pose difference (e.g., based on body joint coordinates) of the image pair from the same track.

Figure 5B:
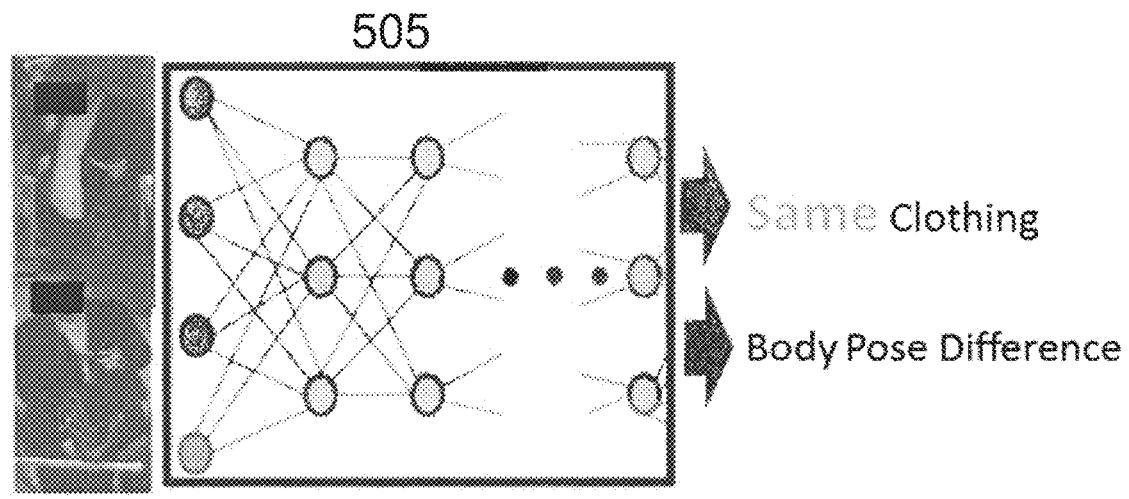
FIG. 5B illustrates a pair of images from the first track 590 which are input to the neural network 505 which has been trained by the pose-aware feature learning system 100, 400.

For example, FIG. 5B illustrates a pair of images from the first track 590 which are input to the neural network 505 which has been trained by the pose-aware feature learning system 100, 400. As illustrated in FIG. 5B, given the pair of images from the first track 590 as input, the pose-aware feature learning system 100, 400 may determine that the pair of images depicts the same clothing and a different body pose.

Thus, the present invention does not need any manual labels to tell whether two images have the same clothing. All the information that is needed to train the neural network is captured by tracking subjects (e.g., people) over a video sequence. The neural network can have the same architecture of the original neural network, just adapted to receive an input pair (e.g., using a standard Siamese network with shared weights), and producing different output. All of the intermediate weights in the neural network can be used to initialize the original neural network.

Different tracks, such as the first track 590 and the second track 595 in FIG. 5A, usually depict different subjects with different objects (e.g., different people wearing different clothing), although, of course, this assumption may be violated for some attributes (e.g., two persons wearing a t-shirt). The pose-aware feature learning system 100, 400 can still train the neural network to learn discriminative clothing features from different tracks.

Figure 5C:
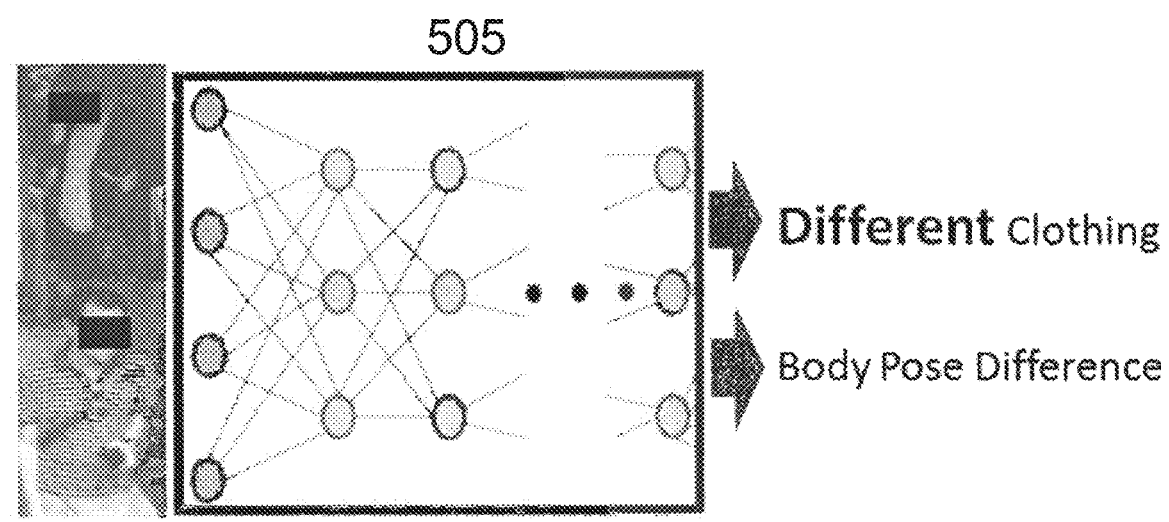
FIG. 5C illustrates a pair of images including an image from the first track 590 and an image from the second track 595 which are input to the neural network 505 which has been trained by the pose-aware feature learning system 100, 400.

FIG. 5C illustrates a pair of images including an image from the first track 590 and an image from the second track 595 which are input to the neural network 505 which has been trained by the pose-aware feature learning system 100, 400. As illustrated in FIG. 5C, given the pair of images from the first and second tracks 590, 595 as input, the pose-aware feature learning system 100, 400 may determine that the pair of images depicts different clothing and a different body pose.

It should be noted that the processes depicted in FIGS. 5A-5C are just to train the neural network in the pose-aware feature learning system (e.g., initialize the parameters of the neural network). Therefore, noise (e.g., two different tracks with the same clothing) can be tolerated in these processes.

Although the term "clothing" may be used at times to describe the pose-aware feature learning system 100, 400, the proposed technique in the pose-aware feature learning system 100, 400 is not limited to "clothing", but can be used to detect other objects in a video, such as pieces of an outfit including shoes, handbags, jewelry, and other accessories.

The training of the neural network (e.g., initialization of the neural network) by the pose-aware feature learning system 100, 400 in the present invention may offer significant advantages over other alternative methods based on random initialization of weights, reconstruction-based pre-training (e.g., unsupervised pet training), and discriminative pre-training based on general image datasets such as imagenet. The neural network training (e.g., initialization) of the present invention may produce features that are specific to clothing and are more robust to handle pose variations.

Moreover, the pose-aware feature learning system 100, 400 may train the neural network without costly manual annotation of training samples. Once the neural network has been trained (e.g., initialized) by the pose-aware feature learning system 100, 400, the limited labeled training data available can be used to fine-tune the weights of the network for the task of fine-grained clothing attribute prediction.

In addition to being robust to pose variations, the proposed neural network training technique of the pose-aware feature learning system 100, 400 may also help under light changes. That is, the sun light changes throughout the day and also based on the latitude. Also, different indoor light sources often make problems in extracting object (e.g., clothing) attributes correctly. By using the sequence of images possibly under changing light conditions (as the person walking through various parts of a building), the proposed neural network training technique of the pose-aware feature learning system 100, 400 may produce features that are specific to clothing and are more robust to light variations.

Object Recognition System

Figure 6A:
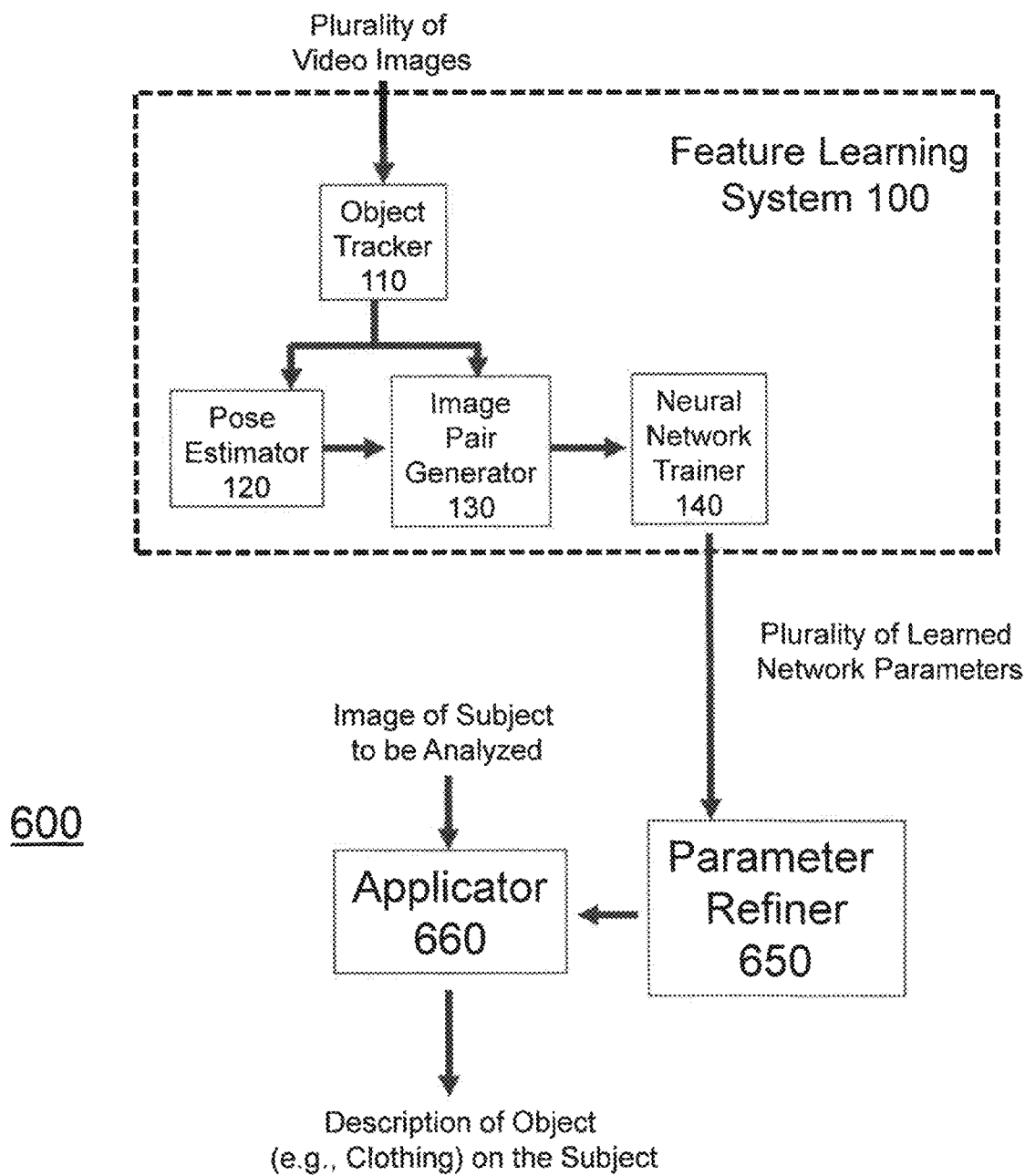
FIG. 6A illustrates an object recognition system 600, according to another exemplary aspect of the present invention.

FIG. 6A illustrates an object recognition system 600, according to another exemplary aspect of the present invention.

As illustrated in FIG. 6A, the object recognition system 600 includes the pose-aware feature learning system 100 which trains a neural network based on a labeled plurality of image pairs, to predict whether an image pair depicts the same or different object and a pose difference for the image pair.

As described above, the pose-aware feature learning system 100 may include an object tracker 110 which tracks an object on a subject in a plurality of video frames, a pose estimator 120 which estimates a pose of the subject in a track of the plurality of video frames, an image pair generator 130 which extracts the plurality of image pairs from the track of the plurality of video frames, and labels the plurality of image pairs with the estimated pose and as depicting the same or different object, and a neural network trainer 140 which trains a neural network based on the labeled plurality of image pairs, to predict whether an image pair depicts the same or different object and a pose difference for the image pair.

The pose-aware feature learning system 100 may also include an object detector (e.g., object detector 405 in FIG. 4) which detects the object on the subject in a video frame (i.e., a video frame of a plurality of video frames), and transmits the video frame including the detected object (e.g., a bounding box which surrounds the object) to the object tracker 110.

As illustrated in FIG. 6A, the object recognition system 600 may also include a parameter refiner 650 for refining the learned network parameters of the neural network with a set of labeled training examples, and an applicator 660 for applying the refined learned network parameters for object recognition.

For example, the applicator 660 may input an image of a subject (e.g., person), and identify an object on the subject. The object may include, for example, an item of clothing, or some other object which is located on (e.g., worn by) the subject. The subject may include, for example, a person with a mental health condition or disease, a person with a physical health condition or disease, an autistic person, an elderly person, a criminal suspect, and a terrorism suspect.

Figure 6B:
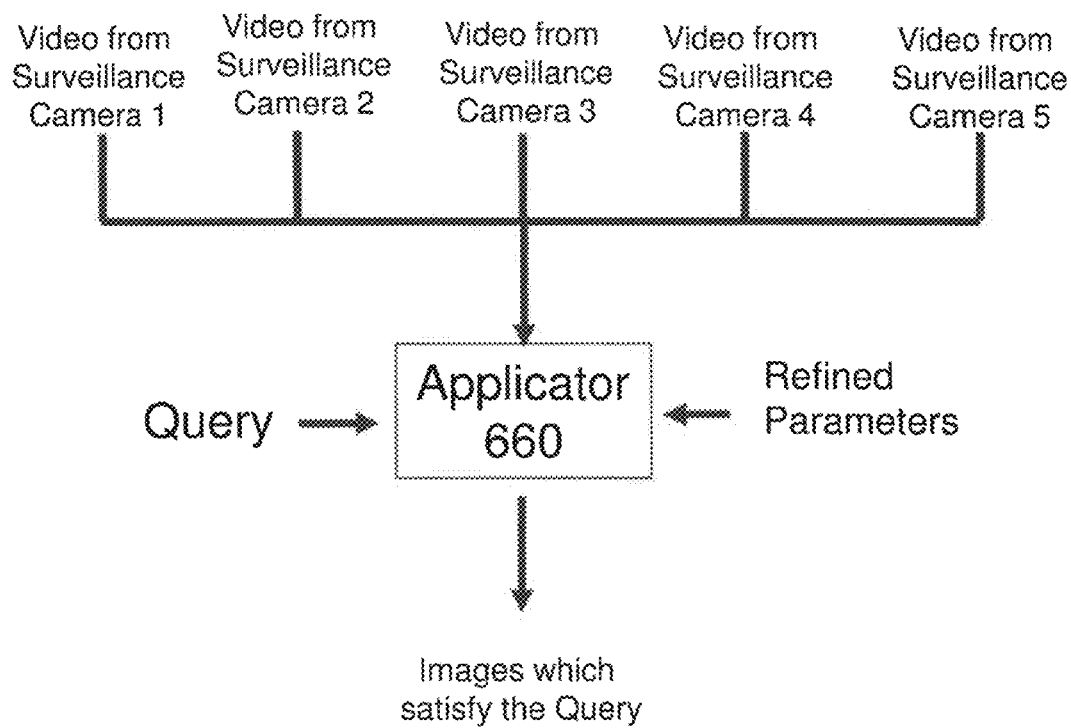
FIG. 6B illustrates an applicator 660 according to another exemplary aspect of the present invention.

FIG. 6B illustrates an applicator 660 according to another exemplary aspect of the present invention.

As illustrated in FIG. 6B, the applicator 660 (e.g., a computer executing software to perform a method of the present invention) may receive as input, video from a plurality of video cameras (e.g., surveillance cameras 1-5) and the refined parameters from the parameter refiner 650. The applicator 660 may receive query via an input device (e.g., keyboard, touch screen display, etc.), and utilize the refined parameters of the neural network to analyze the input video and generate, based on the analysis, a list of images which satisfy the query.

Figure 7:
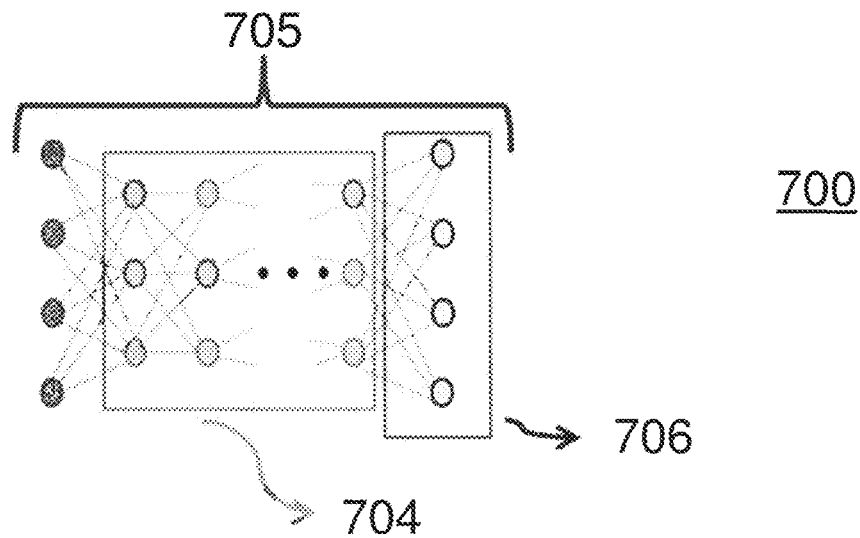
FIG. 7 provides a diagram 700 illustrating a concept of an exemplary aspect of the present invention.

FIG. 7 provides a diagram 700 illustrating a concept of an exemplary aspect of the present invention. The concept illustrated in the diagram 700 may be applied, for example, to the object recognition system 500.

As illustrated in the diagram 700, the object recognition system 600 may initialize the learned network parameters 704 of a neural network 705 using the pose-aware feature learning system described above (e.g., a system which learns pose-aware features that are specific to objects (e.g., clothing) from video without requiring manually annotated data (e.g., manually labeled data)). Then, using the initialized network parameters 704 (e.g., initial network parameters), the object recognition system 600 may train the last layer 706 of the neural network 705 (e.g., train only the last layer) resulting in significantly fewer parameters than in conventional methods.

Although it is not necessary to the present invention, the object recognition system 600 may also train the last layer 706 with annotated object data (e.g., manually annotated clothing data), and then fine-tune the entire neural network 705 with a well-known backpropagation algorithm.

Figure 8:
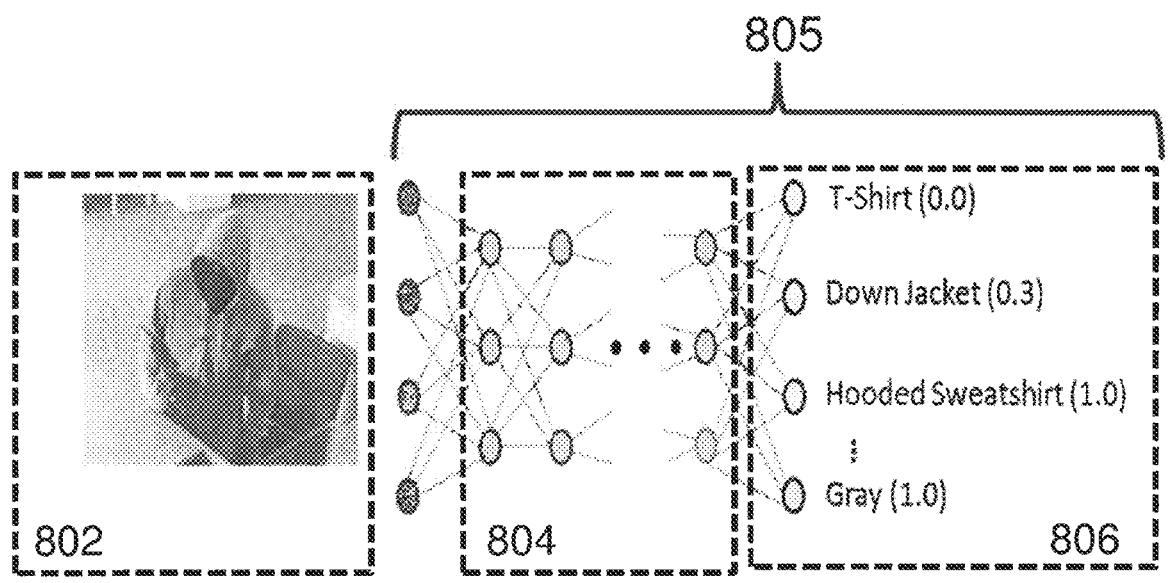
FIG. 8 provides a diagram 800 illustrating another concept of an exemplary aspect of the present invention.

FIG. 8 provides a diagram 800 illustrating another concept of an exemplary aspect of the present invention. The concept illustrated in the diagram 800 may be applied, for example, to the object recognition system 600.

As illustrated in the diagram 800, the object recognition system 600 may input an image 802 of a subject (e.g., person) into a neural network 805 (e.g., deep neural network), including the learned network parameters 804 from the pose-aware feature learning system 100, 400 described above, and a last layer 806 which has been trained using the initialized network parameters 804. As noted above, the last layer 806 may also be trained with annotated object data (e.g., manually annotated clothing data), and then the entire neural network 805 can be "fine-tuned" by using a well-known backpropagation algorithm.

Thus, the object recognition system 600 may output a set of nodes (e.g., the last layer 806 of the neural network 805) indicating the confidence (0,1) of each object attribute (e.g., clothing attribute). For example, where the object is clothing, the output set of node may include clothing attributes such as colors, patterns, style, material, etc.

Deep neural networks have a large set of parameters to be estimated and, therefore, conventional object recognition systems may require a large number of annotated training examples which may not be available or may be too costly to obtain. Thus, in conventional systems and methods, when only a few training samples are available, the network overfits to the training data and accuracy drops at test time. These problems of conventional object recognition systems may be solved by the object recognition system 600 which includes a pose-aware feature learning system (e.g., system 100, 400) according to an exemplary aspect of the present invention.

Additional Considerations

In an age with a seemingly increasing incidence of people with pre-Alzheimer's and Alzeimer's diseases, there are frequent stories of people "wandering off" who need to be found. Similarly, missing people with autism are often in the news, and these people may wander off and be difficult to find.

In particular, it has been shown that six in ten people with dementia will wander away from a home or caregiver. A person with Alzheimer's may not remember his or her name or address, and can become disoriented, even in familiar places. Wandering among people with dementia is dangerous, and it is desirable to provide improved strategies and services to help prevent the wandering of those persons with dementia.

In addition, it has been shown that half of children with autism will wander away, or elope, from the safe environment of a home or caregiver, and more than one-third of autistic children who wander are considered nonverbal. Finding and safely recovering a missing child with autism presents unique and difficult challenges for families, law enforcement, first responders and search teams. Wandering among autistic children is dangerous and, therefore, it is desirable to provide improved strategies and services to help prevent the wandering of autistic children.

Even healthy children sometimes become separated from their parents and go missing, and significant time and effort is often expended by their parents and others (e.g., law enforcement) in an effort to return the missing children to their parents.

In addition, family pets commonly stray from their owners, and significant time and effort is often expended by their owners and others in an effort to return the missing pets to their owners.

Further, law enforcement and other governmental agencies expend a huge amount of time and money in searching for criminal suspects, and terrorism suspects.

The object recognition system 600 may provide improved capabilities in each of these cases. For example, with respect to missing persons (e.g., missing Alzheimer's patients, autistic persons, children, etc.), criminal suspects and terrorism suspects, the object recognition system 600 may search for such persons based on the clothing that the persons are wearing. For example, referring to FIG. 6B, the query which is input to the applicator 660 of the object recognition system 600 may read "show me all people with a black down jacket and denim pants from time x to time y, considering all cameras in the downtown area", and in response to the query, the applicator 660 may extract images from the video recorded by those cameras which satisfy the query, and generate a display of the extracted images and/or display a list (e.g., on a display screen, on a sheet of paper, etc.) of the extracted images.

Similarly, with respect to a missing pet, the query which is input to the applicator 660 may read "show me all dogs with a black collar and a white coat with brown spots, considering all cameras in the downtown area", and in response to the query, the applicator 660 may extract images from the video recorded by those cameras which satisfy the query, and generate a display of the extracted images and/or display a list (e.g., on a display screen, on a sheet of paper, etc.) of the extracted images.

Advantages

The exemplary aspects of the present invention may provide significant benefits over conventional systems.

In particular, some conventional systems segment and classify clothing from surveillance videos, by using SIFT/HOG features. However, these conventional systems do not address the problem of learning (e.g., unsupervised learning) of deep features for clothing recognition.

Other conventional systems classify the clothing item into at least one category based on the determined color composition, texture composition, collar configuration, and sleeve configuration. The present invention may produce similar output to these conventional systems, but may rely on richer deep features which are learned from video without costly manual annotation for training data.

Other conventional systems retrieve similar clothing images given a query image. The present invention, however, may predict clothing attribute tags which is a complementary task and could be used to improve content based retrieval.

Further, clothing recognition has also been used in some conventional systems for context-aided people identification, fashion style recognition, occupation recognition, and social tribe prediction. However, none of these conventional systems address can learn feature representations for clothing without significant annotation costs.

Referring to FIGS. 1-8, another aspect of the present invention is directed to a computer program product which may include, for example, a computer readable storage medium (hereinafter, the "storage medium") that may store computer readable program instructions (hereinafter, the "computer program" or "instructions") for performing the features and functions of the pose-aware feature learning system 100, 400, object recognition system 600 and performing the method 300. That is, the storage medium may store the instructions thereon for causing a processing device (e.g., computer, instruction execution device, computing device, computer processor, central processing unit (CPU), microprocessor, etc.) to perform a feature or function of the present invention.

The storage medium can be a tangible device that can retain and store the instructions for execution by the processing device. The storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The storage medium, as used herein, should not be construed as merely being a "transitory signal" such as a radio wave or other freely propagating electromagnetic wave, an electromagnetic wave propagating through a waveguide or other transmission media (e.g., light pulses passing through a fiber-optic cable), or an electrical signal transmitted through a wire.

The processing device can access the instructions on the storage medium. Alternatively, the processing device can access (e.g., download) the instructions from an external computer or external storage device via a network such as the Internet, a local area network, a wide area network and/or a wireless network.

The network may include, for example, copper transmission cables, optical transmission fibers, wireless transmission, routers, firewalls, switches, gateway computers and/or edge servers. For example, the processing device may include a network adapter card or network interface which receives the instructions from the network and forwards the instructions to the storage medium within the processing device which stores the instructions.

The instructions for performing the features and functions of the present invention may include, for example, assembler instructions, instruction-set-architecture (ISA) instructions, machine instructions, machine dependent instructions, microcode, firmware instructions, state-setting data, or either source code or object code written in one or more programming languages (or combination of programming languages), including an object oriented programming language such as Java, Smalltalk, C++ or the like, and conventional procedural programming languages, such as the "C" programming language or similar programming languages.

The instructions may execute entirely on the processing device (e.g., a user's computer), partly on the processing device, as a stand-alone software package, partly on the processing device and partly on a remote computer or entirely on the remote computer or a server. For example, the instructions may execute on a remote computer which is connected to the processing device (e.g., user's computer) through a network such as a local area network (LAN) or a wide area network (WAN), or may execute on an external computer which is connected to the processing device through the Internet using an Internet Service Provider.

The processing device may include, for example, electronic circuitry including, for example, programmable logic circuitry, field-programmable gate arrays (FPGA), or programmable logic arrays (PLA) that may execute the instructions by utilizing state information of the instructions to personalize the electronic circuitry, in order to perform a feature or function of the present invention.

It should be noted that the features and functions of the present invention which are described above with reference to FIGS. 1-8 may be implemented by the processing device executing the instructions. That is, each block of the flowchart illustrations and/or block diagrams, and combinations of blocks in the flowchart illustrations and/or block diagrams, can be implemented by processing device executing the instructions.

The instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

That is, the instructions may be executed by a processing device to cause a series of operational steps to be performed by the processing device to produce a computer-implemented process, so that the executed instructions implement the features/functions/acts described above with respect to the flowchart and/or block diagram block or blocks of FIGS. 1-8.

Thus, the flowchart and block diagrams in the FIGS. 1-8 illustrate not only a method, system, apparatus or device, but also illustrate the architecture, functionality, and operation of the processing device executing the instructions. In this regard, each block in the flowchart or block diagrams may represent a module, segment, or portion of the instructions, which comprises one or more executable instructions for implementing the specified logical function(s). In some alternative implementations, the features or functions in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
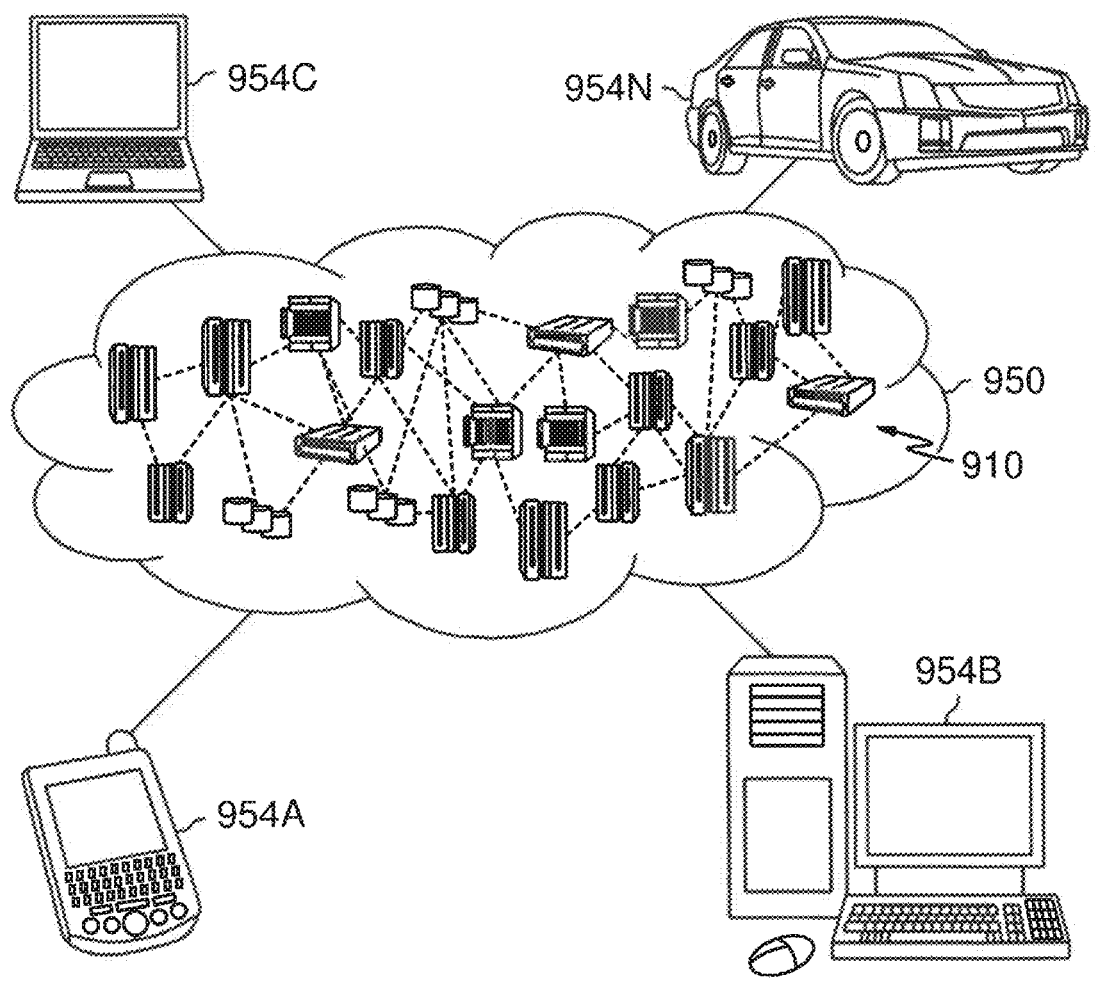
FIG. 9 depicts a cloud computing environment according to an embodiment of the present invention.
Figure 10:
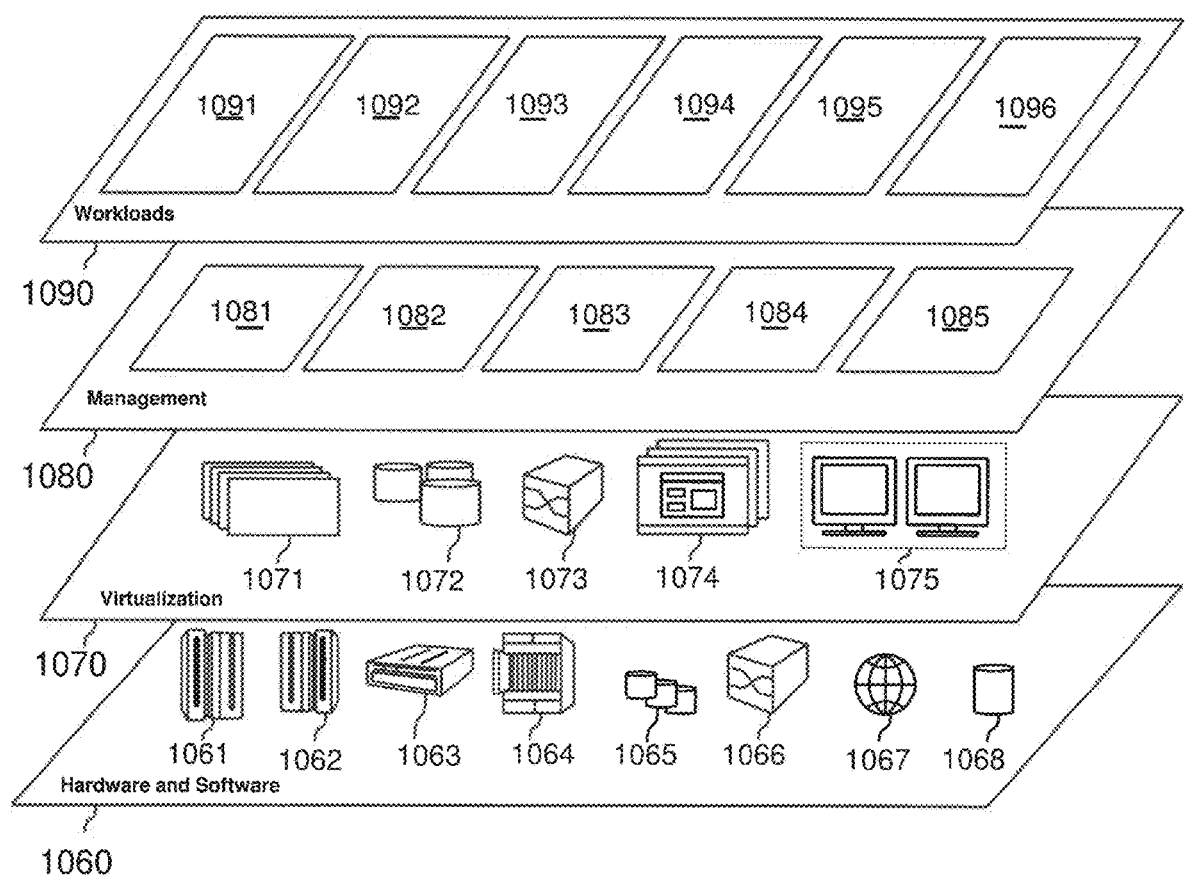
FIG. 10 depicts abstraction model layers according to an embodiment of the present invention.

Referring again to the drawings, FIGS. 9-10 illustrate other exemplary aspects of the present invention.

It is to be understood that although this disclosure includes a detailed description on cloud computing, implementation of the teachings recited herein are not limited to a cloud computing environment. Instead, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof.

This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and pose-aware feature learning 1096.

With its unique and novel features, the present invention provides pose-aware feature learning system and an object recognition system which are more effective and more efficient than conventional methods and systems.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive method and system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. An object recognition system comprising:
a parameter generator that:
estimates a pose of a subject in a video;
extracts an image pair from the video and labels the image pair with the estimated pose and as depicting a same or different object on the subject; and
trains a learning model based on the labeled image pair and generates a parameter of the trained learning model that indicates a pose difference for the image pair;
a parameter refiner for refining the parameter; and
an applicator for applying the refined parameter to object recognition.

2. The object recognition system of claim 1, wherein the applicator inputs an image of a subject to be analyzed and applies the refined parameter to the image to identify an object on the subject to be analyzed.

3. The object recognition system of claim 2, wherein the image of the subject to be analyzed comprises an image from a surveillance camera.

4. The object recognition system of claim 2, further comprising:
an input device for inputting a query to the applicator.

5. The object recognition system of claim 4, wherein the image of the subject to be analyzed comprises a plurality of images, and the applicator analyzes the plurality of images using the refined parameter to identify an image of the plurality of images which satisfies the query.

6. The object recognition system of claim 1, wherein the applicator generates a description of the object.

7. The object recognition system of claim 1, wherein the parameter comprises a parameter of a neural network, and the parameter refiner refines the parameter using a set of labeled training examples.

8. The object recognition system of claim 1, wherein the subject comprises a person and the object comprises an item of clothing worn by the subject.

9. The object recognition system of claim 2, wherein the subject to be analyzed comprises one of a person with a mental health condition, a person with a physical health condition, an autistic person, an elderly person, a criminal suspect, and a terrorism suspect.

10. The object recognition system of claim 1, wherein the parameter generator comprises:
an image pair generator which:
extracts a plurality of image pairs from a track of a plurality of video frames; and
labels the plurality of image pairs with an estimated pose of a subject in the track of the plurality of video frames, and as depicting the same or different object on the subject; and
a neural network trainer which trains a neural network based on the labeled plurality of image pairs, and generates the parameter based on the trained neural network.

11. The object recognition system of claim 10, wherein the parameter generator further comprises:
an object tracker which tracks the object on the subject in the plurality of video frames; and
a pose estimator which estimates the pose of the subject in the track of the plurality of video frames.

12. The object recognition system of claim 10, wherein the neural network trainer:
initializes network parameters of the neural network from video without requiring manually annotated data; and
using the initialized network parameters, trains only a last layer of the neural network.

13. The object recognition system of claim 12, wherein the neural network trainer:
trains the last layer with annotated object data; and
fine-tunes the entire neural network using a backpropagation algorithm.

14. The object recognition system of claim 10, wherein the neural network trainer:
outputs a set of nodes indicating a confidence of each attribute of the object.

15. The object recognition system of claim 14, wherein the object comprises clothing, and the output set of nodes comprises clothing attributes.

16. An object recognition method comprising:
estimating a pose of a subject in a video;
extracting an image pair from the video and labeling the image pair with the estimated pose and as depicting a same or different object on the subject;
training a learning model based on the labeled image pair and generating a parameter of the trained learning model that indicates a pose difference for the image pair;
refining the parameter; and
applying the refined parameter to object recognition.

17. The object recognition method of claim 16, wherein the applying of the refined parameter is performed by an applicator that inputs an image of a subject to be analyzed and applies the refined parameter to the image to identify an object on the subject to be analyzed.

18. The object recognition method of claim 17, wherein the image of the subject to be analyzed comprises an image from a surveillance camera.

19. The object recognition method of claim 18, further comprising:
inputting a query to the applicator,
wherein the image of the subject to be analyzed comprises a plurality of images, and the applicator analyzes the plurality of images using the refined parameter to identify an image of the plurality of images which satisfies the query.

20. A non-transitory programmable storage medium tangibly embodying a program of machine-readable instructions executable by a digital processing apparatus to perform an object recognition method, the object recognition method comprising:
estimating a pose of a subject in a video;
extracting an image pair from the video and labeling the image pair with the estimated pose and as depicting a same or different object on the subject;
training a learning model based on the labeled image pair and generating a parameter of the trained learning model that indicates a pose difference for the image pair;
refining the parameter; and
applying the refined parameter to object recognition.

* * * * *